(12) United States Patent
Nakata et al.

(10) Patent No.: US 12,316,979 B2
(45) Date of Patent: May 27, 2025

(54) IMAGE SENSORS HAVING IMAGE BLUR CORRECTION

(71) Applicant: OmniVision Technologies, Inc., Santa Clara, CA (US)

(72) Inventors: Takatoshi Nakata, Yokohama (JP); Hiroki Ui, Yokohama (JP)

(73) Assignee: OmniVision Technologies, Inc., Santa Clara, CA (US)

( * ) Notice: Subject to any disclaimer, the term of this patent is extended or adjusted under 35 U.S.C. 154(b) by 281 days.

(21) Appl. No.: 18/299,125

(22) Filed: Apr. 12, 2023

(65) Prior Publication Data

US 2024/0348931 A1 Oct. 17, 2024

(51) Int. Cl.
| | |
|---|---|
| *H04N 23/743* | (2023.01) |
| *H04N 23/68* | (2023.01) |
| *H04N 23/73* | (2023.01) |
| *H04N 23/741* | (2023.01) |
| *H04N 25/58* | (2023.01) |

(52) U.S. Cl.
CPC ....... *H04N 23/743* (2023.01); *H04N 23/6845* (2023.01); *H04N 23/73* (2023.01); *H04N 23/741* (2023.01); *H04N 25/58* (2023.01)

(58) Field of Classification Search
None
See application file for complete search history.

(56) References Cited

U.S. PATENT DOCUMENTS

| | | | |
|---|---|---|---|
| 10,157,329 B2 | 12/2018 | Oki | |
| 11,258,967 B2 | 2/2022 | Yamanaka | |
| 2007/0077055 A1* | 4/2007 | Tominaga | H04N 23/68 348/E5.041 |
| 2008/0012969 A1* | 1/2008 | Kasai | H04N 23/741 348/E9.003 |
| 2010/0271498 A1* | 10/2010 | Hwang | H04N 23/68 348/222.1 |
| 2014/0198226 A1* | 7/2014 | Lee | H04N 23/6811 348/208.1 |
| 2015/0062410 A1* | 3/2015 | Kim | H04N 23/74 348/362 |
| 2015/0097978 A1* | 4/2015 | Lee | H04N 23/741 348/208.6 |
| 2015/0156387 A1* | 6/2015 | Miyakoshi | H04N 23/741 348/367 |
| 2015/0201118 A1* | 7/2015 | Lee | H04N 25/76 348/222.1 |
| 2017/0244912 A1* | 8/2017 | Kajimura | H04N 23/667 |
| 2018/0097983 A1* | 4/2018 | Park | H04N 25/58 |
| 2019/0305018 A1* | 10/2019 | Price | H10F 39/8023 |

* cited by examiner

*Primary Examiner* — Twyler L Haskins
*Assistant Examiner* — Wesley J Chiu

(57) ABSTRACT

An image sensor comprises a plurality of high sensitivity photoelectric conversion elements, a plurality of low sensitivity photoelectric conversion elements, and a processor for processing signals read out from the plurality of low sensitivity photoelectric conversion elements and the plurality of high sensitivity photoelectric conversion elements, where the processor is configured to read out signals from the plurality of low-sensitivity photoelectric conversion elements multiple times in a single frame after multiple exposures and obtain a plurality of images of low-sensitivity in the single frame at different times.

14 Claims, 5 Drawing Sheets

IMAGE SENSORS HAVING IMAGE BLUR CORRECTION

FIELD OF THE INVENTION

This disclosure relates to image sensors, and particularly image sensors having image blur correction.

BACKGROUND OF THE INVENTION

Image sensors that include a plurality of high-sensitivity photoelectric conversion elements and a plurality of low-sensitivity photoelectric conversion elements are known. These image sensors may produce high dynamic range (HDR) images in both bright and dark scenes. In bright scenes, the exposure time is short for the high-sensitivity photoelectric conversion elements. If the exposure time is shorter than light pulse and/or interval between light pulses in the pulse width modulation (PWM) light, such as light emitting diode (LED) light, the brightness of the captured image may not be correct.

On the other hand, for low-sensitivity photoelectric conversion elements, the exposure time can be longer, and therefore the above problem with PWM light, such as LED light, can be solved. However, long exposure time may cause blurred images of moving objects.

Furthermore, in complementary metal-oxide-semiconductor (CMOS) image sensors with a lateral overflow integration capacitor (LOFIC) structure, similar blurred images of moving objects may be produced.

Accordingly, image sensors including low sensitivity photoelectric conversion elements or LOFIC structure that have image blur correction are demanded.

SUMMARY

The below summary is merely representative and non-limiting. The above problems are overcome, and other advantages may be realized, by the use of the embodiments.

According to an example of the present disclosure, an image sensor comprises a plurality of photoelectric conversion elements, and a processor for processing signals read out from the plurality of photoelectric conversion elements, wherein the processor is configured to read out the signals from the plurality of photoelectric conversion elements multiple times in a single frame after multiple exposures and obtain a plurality of images at different times in the single frame, detect a moving object in the plurality of images by comparing the plurality of images obtained from the multiple readouts, move a position of the moving object in each image of the plurality of images so that each position of the moving object in the plurality of images is same position, and combine the plurality of images after each position of the moving object in the plurality of images is same position.

According to another example of the present disclosure, an image sensor comprises a plurality of high-sensitivity photoelectric conversion elements, a plurality of low-sensitivity photoelectric conversion elements, and a processor for processing signals read out from the plurality of low-sensitivity photoelectric conversion elements and the plurality of high-sensitivity photoelectric conversion elements, wherein the processor is configured to read out signals from the plurality of low-sensitivity photoelectric conversion elements multiple times in a single frame after multiple exposures and obtain a plurality of images of low-sensitivity at different times in the single frame, detect a moving object in the plurality of images of low-sensitivity by comparing the plurality of images of low-sensitivity obtained from the multiple readouts, move a position of the moving object in each image of the plurality of images of low-sensitivity so that each position of the moving object in the plurality of images of low-sensitivity is same position, and combine the plurality of images of low-sensitivity after each position of the moving object in the plurality of images of low-sensitivity is same position, forming a composite image of low-sensitivity.

The present disclosure also relates to an image signal processing method using the above image sensors.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
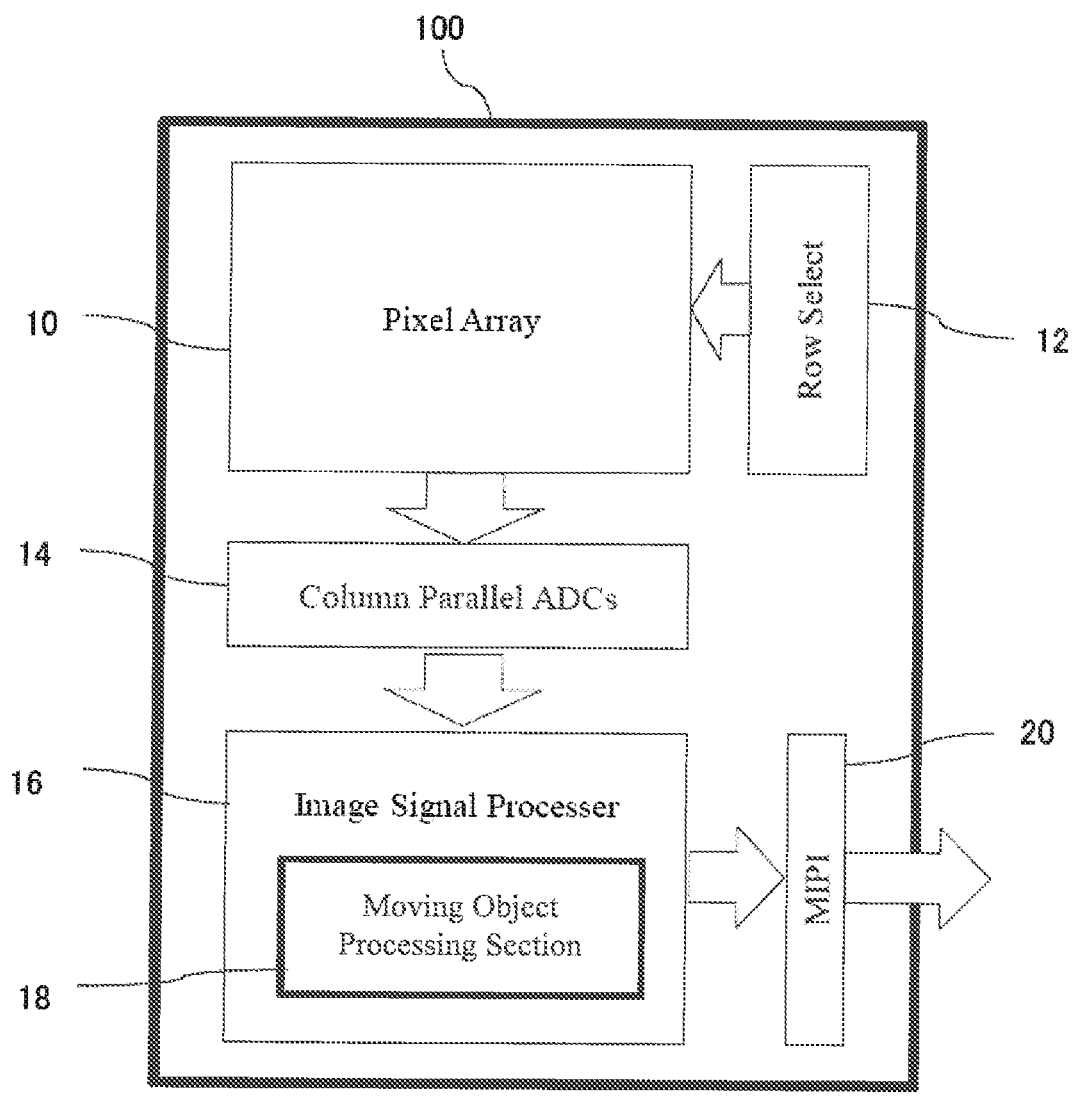
FIG. 1 is a block diagram showing a configuration of an image sensor.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

FIG. 1 is a block diagram showing a configuration of an image sensor 100 of an embodiment. Image sensor 100 in this embodiment is mounted on a single semiconductor chip and includes a pixel array 10 and an image signal processor 16 (processor 16) that processes signals read out from pixel array 10.

Pixel array 10 includes a plurality of pixels arranged in a matrix. In this embodiment, pixel array 10 includes a plurality of high-sensitivity photoelectric conversion elements (e.g., high-sensitivity photodiodes) and a plurality of low-sensitivity photoelectric conversion elements (e.g., low-sensitivity photodiodes). The high-sensitivity photoelectric conversion element may be a large photodiode with a large photosensitive area, and the low-sensitivity photoelectric conversion element may be a small photodiode with a small photosensitive area.

It is appreciated that the expression of high-sensitivity photoelectric conversion element may also represent high-sensitivity photodiode. The expressions of "high-sensitivity photoelectric conversion element" and "high-sensitivity photodiode" may be used interchangeably. Similarly, the expression of low-sensitivity photoelectric conversion element may also represent low-sensitivity photodiode. The expressions of "low-sensitivity photoelectric conversion element" and "low-sensitivity photodiode" may be used interchangeably.

Figure 2:
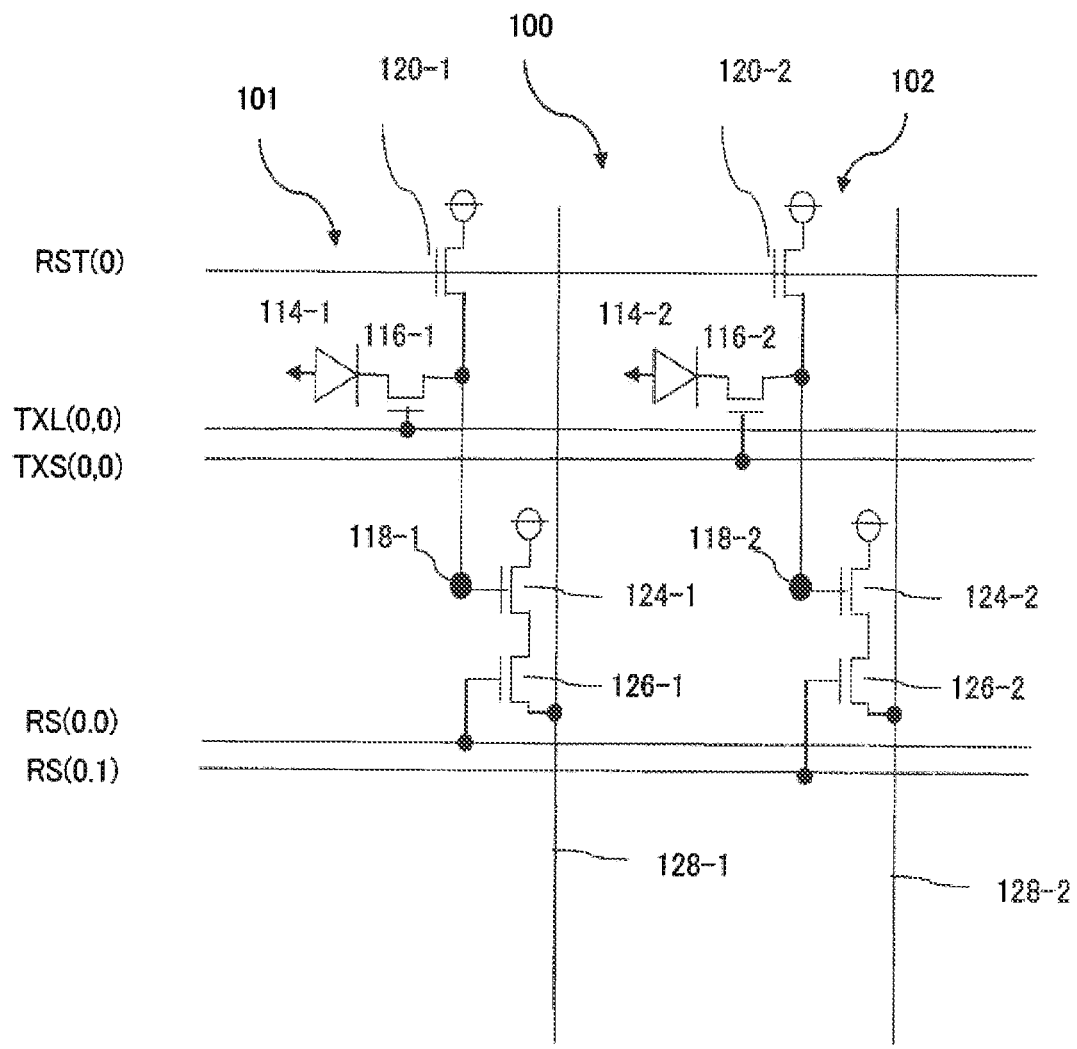
FIG. 2 shows a configuration of a single pixel.

Referring to FIG. 2, a high-sensitivity photodiode 114-1 may produce a relatively large output for a given amount of light received during an exposure time. A low-sensitivity photodiode 114-2 may produce a relatively small output for the same given amount of light received during the same exposure time. This configuration allows a single pixel having a high-sensitivity photodiode and a low-sensitivity photodiode.

On the other hand, a LOFIC structure can be used to function as low-sensitivity photodiode 114-2. The LOFIC structure allows overflowed charges to be stored, and provides a low-sensitivity output. Therefore, for low-sensitivity photodiode 114-2, a photodiode, which is the same as a photodiode of high-sensitivity photodiode 114-1, with the LOFIC structure may be used instead of a photodiode with small photosensitive area.

Back to FIG. 1, a row selection circuit 12 and a column parallel analog-to-digital convertor (ADC) 14 are connected to pixel array 10. Row selection circuit 12 selects a row of pixel array 10 and causes signals from each pixel in that row to be output to the corresponding column bit lines, respectively. Column parallel ADC 14 converts the analog signals supplied from the bit lines of respective column into digital signals.

Thus, image signals (digital signals) from multiple pixels in a selected row are output from column parallel ADC 14 in parallel. In row selection circuit 12, rows are selected sequentially, and when all rows are selected, image signals of one frame are output from column parallel ADC 14.

Image signals from column parallel ADC 14 are supplied to image signal processor 16, where they are processed in various ways. In this system, image signal processor 16 has a moving object processing section 18. Moving object processing section 18 performs positioning corrections (e.g., moving the position) and other processing on the moving object in the image.

Image signals processed in image signal processor 16 are supplied to a mobile industry processor interface (MIPI) 20 and output in a predetermined format. The output digital image data is displayed on a display or transmitted to next step in a system, for example.

Furthermore, in the example shown in FIG. 2, one pixel includes two photodiodes, i.e., high-sensitivity photodiode 114-1 and low-sensitivity photodiode 114-2. Signals from the two photodiodes are read out independently. However, it is also possible to provide one photodiode per pixel and only one readout circuit for the photodiode.

FIG. 2 shows a configuration of a single pixel. In this example, one pixel has two photodiodes 114-1 and 114-2. For example, photodiode 114-1 is a high-sensitivity photodiode and photodiode 114-2 is a low sensitivity photodiode.

FIG. 2 also shows that a pixel contains a high-sensitivity sub-pixel 101 including high-sensitivity photodiode 114-1 and a low-sensitivity sub-pixel 102 including low-sensitivity photodiode 114-2.

Photodiode 114-1 is connected to a floating diffusion 118-1 with a given capacitance via a transfer transistor 116-1. Photodiode 114-2 is connected to a floating diffusion 118-2 via a transfer transistor 116-2.

Floating diffusions 118-1 and 118-2 have a predetermined capacitance and accumulate the charge transferred from photodiodes 114-1 and 114-2, respectively. A gate of a source follower transistor 124-1 is connected to floating diffusion 118-1. A gate of a source follower transistor 124-2 is connected to floating diffusion 118-2. A drain of source follower transistor 124-1 is connected to the power supply, and a source is connected to a drain of row selection transistor 126-1. A drain of source follower transistor 124-2 is connected to the power supply, and a source is connected to a drain of row selection transistor 126-2.

A gate of row selection transistor 126-1 is connected to a row selection line RS(0,0) and a gate of row selection transistor 126-2 is connected to a row selection line RS(0,1). A source of row selection transistor 126-1 is connected to a bit line 128-1, and a source of row selection transistor 126-2 is connected to a bit line 128-2.

Accordingly, an image signal corresponding to the stored charge of high-sensitivity photodiode 114-1 is read out on bit line 128-1, and an image signal corresponding to the stored charge of low-sensitivity photodiode 114-2 is read out on bit line 128-2.

Gates of reset transistors 120-1 and 120-2 are connected to a reset line RST(0). Drains of reset transistors 120-1 and 120-2 are connected to the power supply, and sources of reset transistors 120-1 and 120-2 are connected to sources of transfer transistors 116-1 and 116-2, respectively.

At beginning, RST(0) is set high (H), which turns on reset transistors 120-1 and 120-2, and then floating diffusions 118-1 and 118-2 are reset. As a result, the outputs of source follower transistors 124-1 and 124-2 are also reset. Next, after RST(0) returns to low (L) and after a predetermined exposure time, a transfer control line TXL(0,0) is turned on. This turns on transfer transistor 116-1, and the accumulated charge of photodiode 114-1 is read out through floating diffusion 118-1 to bit line 128-1.

Also, after RST(0) returns to L, after a predetermined exposure time, transfer control line TXS(0,0) is turned on and the charge of photodiode 114-2 is read out through floating diffusion 118-2 to bit line 128-2. In this manner, the readout operation may be performed multiple times in a frame.

Figure 3:
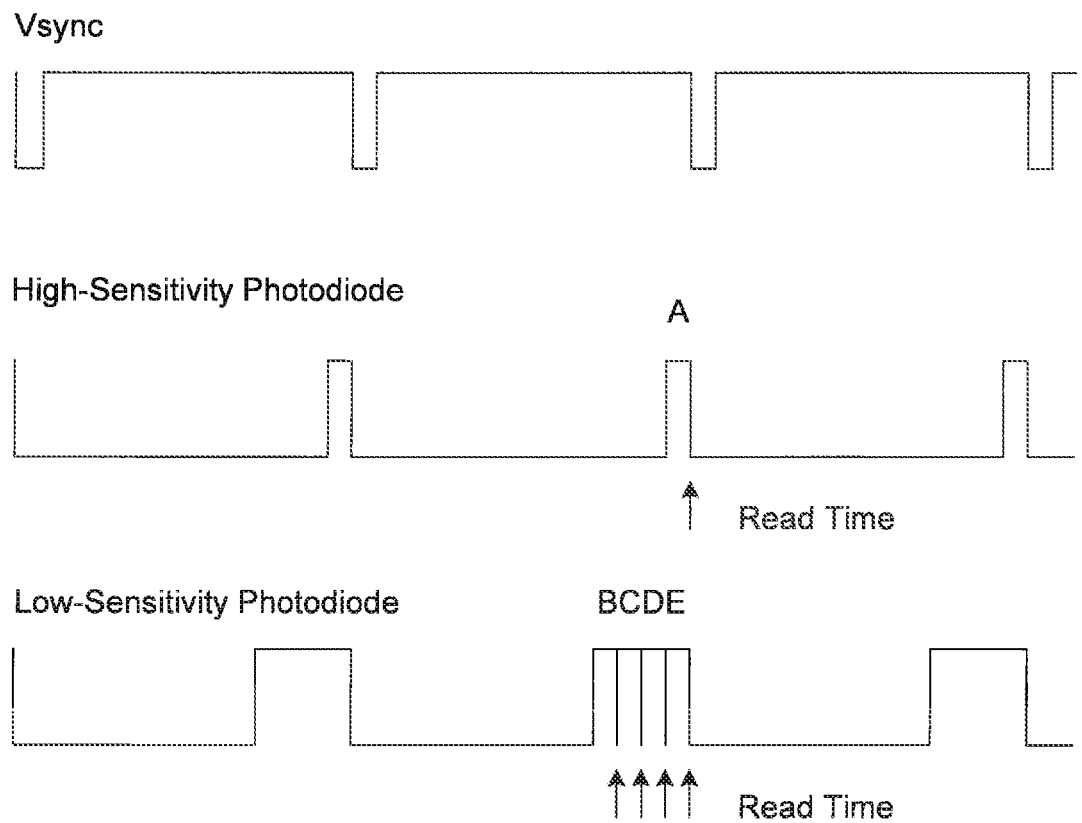
FIG. 3 shows a timing chart of readout at high-sensitivity sub-pixels and low-sensitivity sub-pixels.

FIG. 3 shows a timing chart of the readout of high-sensitivity photodiode 114-1 at high-sensitivity sub-pixels 101 and the readout of low-sensitivity photodiode 114-2 at low-sensitivity sub-pixels 102. FIG. 3 is a not-to-scale drawing. The vertical synchronous signal Vsync is at a low level once at the beginning of every frame. Therefore, one frame image is obtained within two low vertical synchronous signals Vsync. For example, one frame time is 16.67 ms.

At high-sensitivity sub-pixel 101, the charge of photodiode 114-1 is transferred to floating diffusion 118-1 at time after the predetermined exposure A, and the voltage corresponding to this transferred charge is read out as an image signal. For example, an exposure time of A is 1 ms.

Processor 16 reads out signals from high-sensitivity photodiode 114-1 one time in a single frame after exposure A, and obtains an image of high-sensitivity.

On the other hand, at low-sensitivity sub-pixel 102, the exposure time of low-sensitivity 114-2 is relatively long. In this example, the exposure time is B+C+D+E, which may be (but not limited to) four times exposure time of A of high-sensitivity sub-pixel 101. The longer exposure time results in blurring of the image of a fast-moving object or moving object. In this example, low-sensitivity photodiode 114-2 are read four times, each exposure time is the same as exposure time A of high-sensitivity photodiode 114-1. Charge transfer and readout are performed after exposures B, C, D, and E, respectively.

In this example, within a frame, low-sensitivity photodiode 114-2 is read four times, each exposure time is same as the exposure time of high-sensitivity photodiode 114-1. Processor 16 may read out signals from low-sensitivity photodiode 114-2 multiple times in a single frame after multiple exposures and obtain a plurality of images of low-sensitivity at different times in the single frame.

Figure 4:
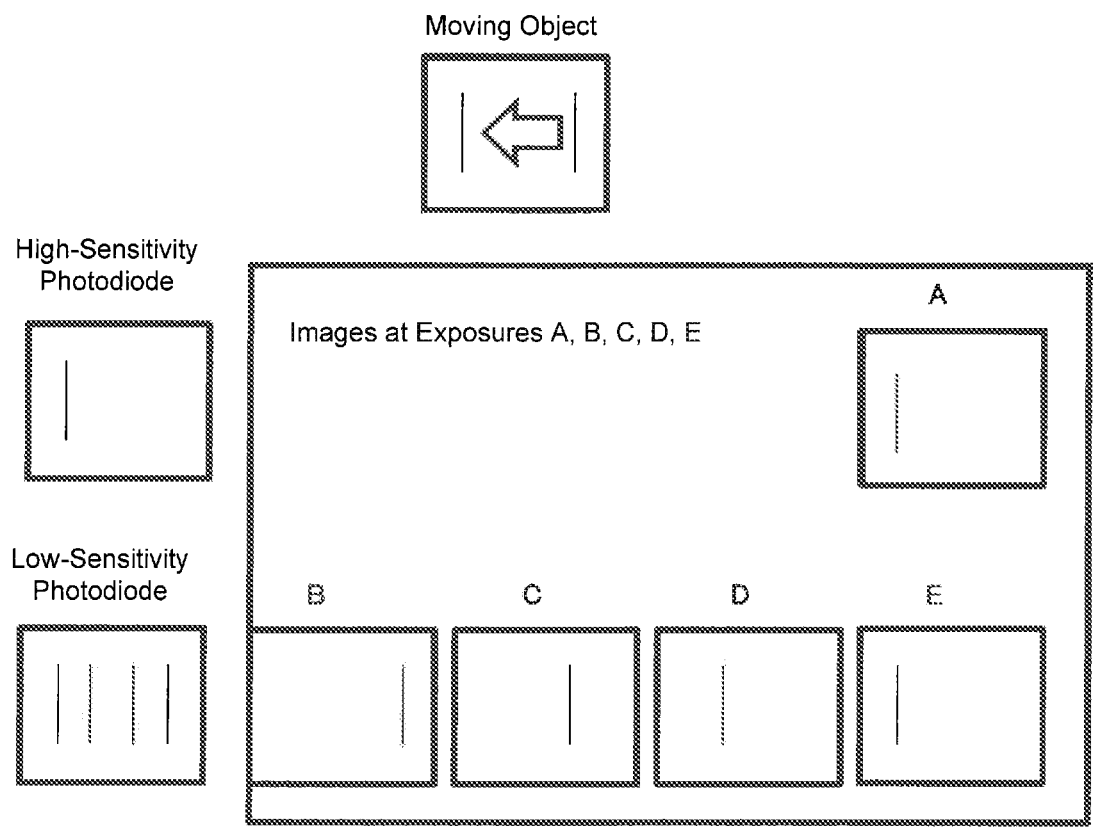
FIG. 4 shows images in the presence of a moving object.

FIG. 4 shows images in the presence of a moving object. In this example, the moving object is indicated by a vertical line that moves from the right edge to the left edge of the screen during exposures B-E. For high-sensitivity photodiode 114-1, the object appears at the left edge of the screen because the image is obtained at exposure A. On the other hand, for low-sensitivity photodiode 114-2, the moving object is at the right edge in the image at exposure B, at the position closer to the right in the image at exposure C, at the position closer to the left in the image at exposure D, and at the left edge in the image at exposure E.

In this example, image signal processor 16 detects the moving object from each image at the four exposures of low-sensitivity photodiode 114-2, which are images of low-sensitivity obtained from multiple readouts. The moving object is detected by comparing images of low-sensitivity obtained from multiple readouts.

The positions of the detected moving object in images of low-sensitivity at exposures B, C, and D are moved to the same position as the position of the detected moving object in the image of the last readout, i.e., at exposure E. A composite image is formed by combining four images of low-sensitivity at the four exposures B-E after each position in the images of low-sensitivity is the same position.

In this example, the exposure A of high-sensitivity photodiode 114-1 and the exposure E of low-sensitivity photodiode 114-2 are taken at the same time. The image of high-sensitivity, e.g., from high-sensitivity 114-1, and the composite image of low-sensitivity, e.g., from low-sensitivity photodiode 114-2, are further combined.

The amount of charges accumulated in low-sensitivity photodiode 114-2 in one exposure period B or C or D out of B+C+D+E is not sufficient. In addition, each image of the one exposure period B or C or D does not solve the problem caused by LED light in high-sensitivity photodiode 114-1 (i.e., the exposure is too short). Therefore, four images at the four exposures B-E are combined to form a composite image. The combined four exposures are sufficiently long to solve the problem caused by PWM light, such as LED light, in high-sensitivity photodiode 114-1.

A background image may be added at the area left empty after the position of the moving object is moved in each of the images of low-sensitivity at three exposures B-D. The adding of the background image at the area left empty after the position of the moving object is moved comprises interpolation or other processing.

In this way, the composite image of low-sensitivity and the image of high-sensitivity are combined, in which a moving object is present at the same position in the composite image of low-sensitivity as in the image of high-sensitivity. In addition, for the composite image of low-sensitivity alone, because the exposure time is sufficiently long, the composite image of low-sensitivity can be obtained without any problem caused by PWM light, such as LED light and the like.

Without position correction of the moving object in the images of low-sensitivity, a one-exposure-in-one-frame image of low-sensitivity contains blurred image of the moving object. The blurred image is corrected using the method of the present disclosure.

Figure 5:
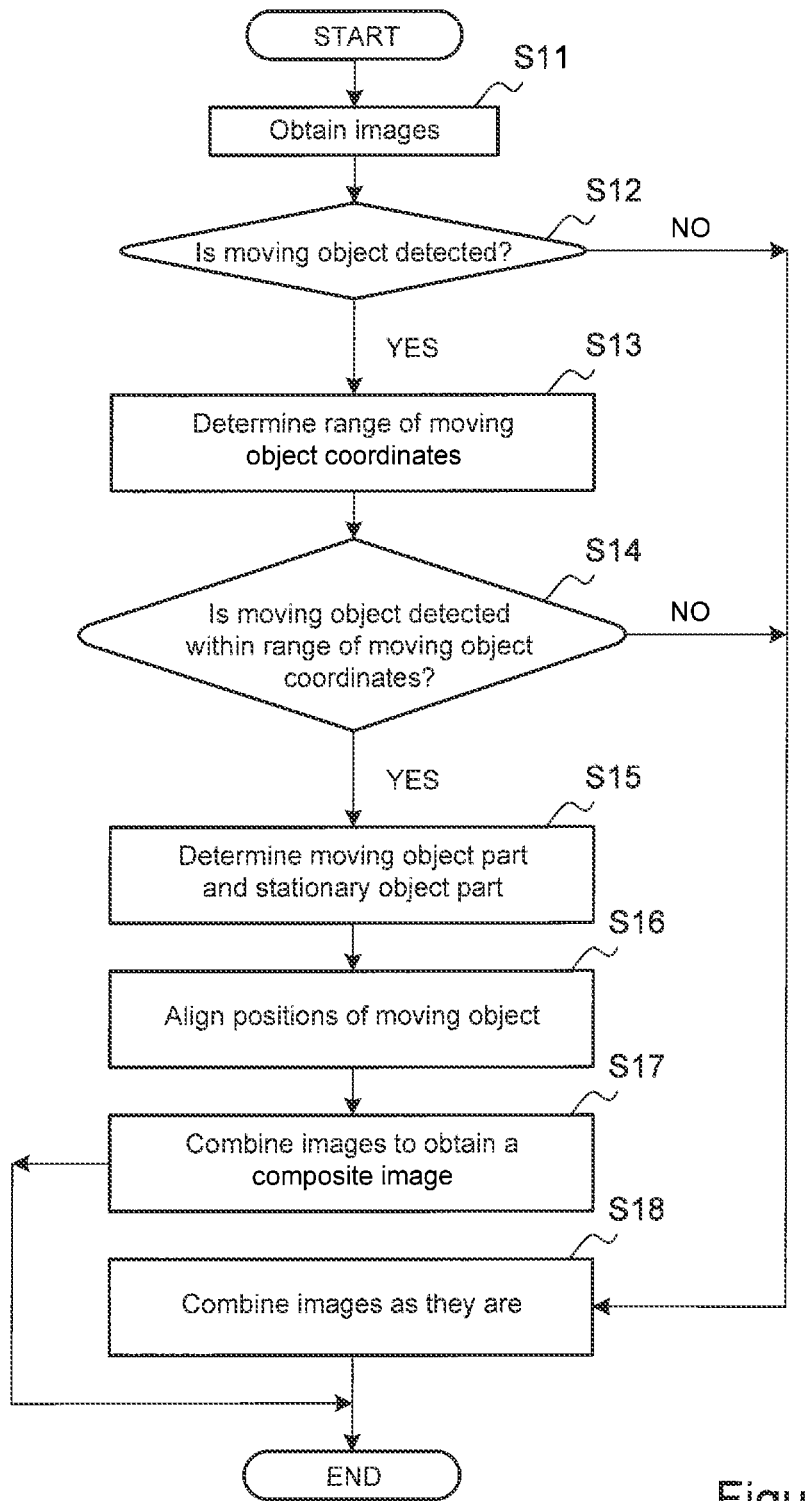
FIG. 5 is an exemplary flowchart showing an operation of an image sensor.

FIG. 5 is an exemplary flowchart showing an operation of an image sensor. An image at exposure A of high-sensitivity photodiode 114-1 and images at exposures B, C, D, and E of low-sensitivity photodiode 114-2 are obtained (S11). A moving object is detected in the acquired images (S12). The detection of moving object can be performed, for example, by frame-to-frame comparison of images of high-sensitivity.

If the judgment in S12 is YES, a range of coordinates of the moving object is determined (S13). That is, from the frame-to-frame comparison of images of high-sensitivity, a range of coordinates of the moving object is determined. In an embodiment, steps S12 and S13 may be skipped.

Next, the B-E images of low-sensitivity are compared to determine if the moving object is detected (S14). In this manner, the moving object should be detected within the range of coordinates of the moving object of S13. This condition is ignored if S12 and S13 are skipped. If YES in S14, then for each of the B-D images, the moving object part and the stationary object part are determined (S15).

If the moving and stationary object parts are determined for each image, the position of the moving object part is aligned with the position of the moving object part in the E image (S16), and all images are combined to obtain a single composite image (S17). If NO is selected in S12 and S14, the images of exposures B-E are combined as they are (S18).

If only one photodiode is provided for a pixel, that one photodiode should be treated as low-sensitivity photodiode 114-2 described above.

In an embodiment, pixel array 10 (FIG. 1) includes a plurality of pixels arranged in a matrix. Each pixel includes only one photodiode as a photoelectric conversion element. Low-sensitivity photodiode 114-2 of FIG. 2 is considered the photodiode.

In the above description, it is assumed that readout from the pixel array 10 is performed row by row. However, it is also possible to read out image signals from multiple rows of pixels in parallel by setting up parallel readout configurations.

In each pixel, signal from the high-sensitivity photodiode may be employed for capturing dark scenes (the high-sensitivity photodiode provides clear image of dark scenes) and signal from the low-sensitivity photodiode may be employed for capturing bright scenes (the low-sensitivity photodiode provides non-saturated image of bright scenes). Both signals may be combined together.

While the present invention has been described herein with respect to the exemplary embodiments and the best mode for practicing the invention, it will be apparent to one of ordinary skill in the art that many modifications, improvements and sub-combinations of the various embodiments, adaptations, and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An image sensor comprising:
a plurality of high-sensitivity photoelectric conversion elements;
a plurality of low-sensitivity photoelectric conversion elements; and
a processor for processing signals read out from the plurality of low-sensitivity photoelectric conversion elements and the plurality of high-sensitivity photoelectric conversion elements;
wherein the processor is configured to:
read out signals from the plurality of low-sensitivity photoelectric conversion elements multiple times in a single frame after multiple exposures and obtain a plurality of images of low-sensitivity at different times in the single frame;
detect a moving object in the plurality of images of low-sensitivity by comparing the plurality of images of low-sensitivity obtained from the multiple readouts;
move a position of the moving object in each image of the plurality of images of low-sensitivity so that each position of the moving object in the plurality of images of low-sensitivity is same position; and
combine the plurality of images of low-sensitivity after each position of the moving object in the plurality of images of low-sensitivity is same position, forming a composite image of low-sensitivity;
wherein the processor is further configured to read out signals from the plurality of high-sensitivity photoelectric conversion elements one time in the single frame after an exposure and obtain an image of high-sensitivity in the single frame; and
wherein the processor is further configured to detect the moving object in the plurality of images of low-sensitivity by frame-to-frame comparison of images of high-sensitivity prior to comparing the plurality of images of low-sensitivity obtained from the multiple readouts.

2. The image sensor of claim 1, wherein the processor is further configured to add a background image in an area left empty after the position of the moving object is moved in each of the plurality of images.

3. The image sensor of claim 2, wherein the adding of the background image in the area left empty after the position of the moving object is moved comprises interpolation.

4. The image sensor of claim 1, wherein the one time readout of signals from the plurality of high-sensitivity photoelectric conversion elements is at a same time as a last readout of the multiple time readouts of signals from the plurality of low-sensitivity photoelectric conversion elements.

5. The image sensor of claim 4, wherein the processor is further configured to combine the composite image of low-sensitivity and the image of high-sensitivity.

6. The image sensor of claim 1, wherein the exposure time of the image of high-sensitivity is same as an exposure time of each of the plurality of images of low-sensitivity.

7. The image sensor of claim 1, wherein:
each of the plurality of high-sensitivity photoelectric conversion elements produces a large output for a given amount of light received; and
each of the plurality of low-sensitivity photoelectric conversion elements produces a small output for the given amount of light received.

8. A method of reading out of an image sensor, wherein the image sensor comprises a plurality of low-sensitivity photoelectric conversion elements and a plurality of high-sensitivity photoelectric conversion elements, comprising:
reading out signals from the plurality of low-sensitivity photoelectric conversion elements multiple times in a single frame after multiple exposures and obtaining a plurality of images of low-sensitivity at different times in the single frame;
detecting a moving object in the plurality of images of low-sensitivity by comparing the plurality of images of low-sensitivity obtained from the multiple readouts;
moving a position of the moving object in each image of the plurality of images of low-sensitivity so that each position of the moving object in the plurality of images of low-sensitivity is same position; and
combining the plurality of images of low-sensitivity after each position of the moving object in the plurality of images of low-sensitivity is same position forming a composite image of low-sensitivity; and
detecting the moving object in the plurality of images of low-sensitivity by frame-to-frame comparison of images of high-sensitivity prior to comparing the plurality of images of low-sensitivity obtained from the multiple readouts.

9. The method of claim 8, further comprising:
adding a background image in an area left empty after the position of the moving object is moved in each of the plurality of images.

10. The method of claim 9, wherein the adding of the background image in the area left empty after the position of the moving object is moved comprises interpolation.

11. The method of claim 8 further comprising:
reading out signals from the plurality of high-sensitivity photoelectric conversion elements one time in the single frame after an exposure and obtain an image of high-sensitivity in the single frame.

12. The method of claim 11, wherein the one time readout of signals from the plurality of high-sensitivity photoelectric conversion elements is at a same time as a last readout of the multiple time readouts of signals from the plurality of low-sensitivity photoelectric conversion elements.

13. The method of claim 12 further comprising:
combining the composite image of low-sensitivity and the image of high-sensitivity.

14. The method of claim 11, wherein the exposure time of the image of high-sensitivity is same as an exposure time of each of the plurality of images of low-sensitivity.

* * * * *